United States Patent
Emralino et al.

(10) Patent No.: US 9,423,980 B1
(45) Date of Patent: Aug. 23, 2016

(54) METHODS AND SYSTEMS FOR AUTOMATICALLY ADDING INTELLIGENT STORAGE ADAPTERS TO A CLUSTER

(71) Applicant: QLOGIC, Corporation, Aliso Viejo, CA (US)

(72) Inventors: Normin A. Emralino, Huntington Beach, CA (US); Ajmer Singh, Rancho Santa Margarita, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 55 days.

(21) Appl. No.: 14/302,706

(22) Filed: Jun. 12, 2014

(51) Int. Cl.
*G06F 3/06* (2006.01)

(52) U.S. Cl.
CPC ............ *G06F 3/0664* (2013.01); *G06F 3/0604* (2013.01); *G06F 3/067* (2013.01)

(58) Field of Classification Search
CPC ...... G06F 3/0664; G06F 3/067; G06F 3/0604
USPC ................. 710/14–19, 74; 707/623
See application file for complete search history.

(56) References Cited

U.S. PATENT DOCUMENTS

| | | | |
|---|---|---|---|
| 5,689,678 A | 11/1997 | Stallmo et al. | |
| 6,219,676 B1 | 4/2001 | Reiner | |
| 6,467,022 B1 | 10/2002 | Buckland et al. | |
| 6,484,229 B1 | 11/2002 | Ichikawa et al. | |
| 6,502,205 B1 | 12/2002 | Yanai et al. | |
| 6,799,283 B1 | 9/2004 | Tamai et al. | |
| 6,922,754 B2 | 7/2005 | Liu et al. | |
| 7,013,336 B1 | 3/2006 | King | |
| 7,249,221 B2 | 7/2007 | Shimada | |
| 7,272,674 B1 | 9/2007 | Nandi et al. | |
| 7,356,573 B2 | 4/2008 | Sharma et al. | |
| 7,506,124 B2 | 3/2009 | Sharma et al. | |
| 7,617,289 B2* | 11/2009 | Srinivasan | H04L 67/1095 707/999.202 |
| 7,631,155 B1 | 12/2009 | Bono et al. | |
| 7,685,269 B1 | 3/2010 | Thrasher et al. | |
| 7,873,619 B1 | 1/2011 | Faibish et al. | |
| 8,099,499 B2 | 1/2012 | Oeda | |
| 8,510,265 B1 | 8/2013 | Boone et al. | |
| 8,555,022 B1 | 10/2013 | Edwards et al. | |
| 8,589,550 B1 | 11/2013 | Faibish et al. | |
| 8,639,872 B1 | 1/2014 | Boyle et al. | |
| 8,805,951 B1 | 8/2014 | Faibish et al. | |
| 8,863,145 B2 | 10/2014 | Watanabe et al. | |
| 9,009,444 B1 | 4/2015 | Derbeko et al. | |
| 9,172,586 B1* | 10/2015 | Shah | H04L 29/08549 |

(Continued)

OTHER PUBLICATIONS

"International Search Report on corresponding PCT application (PCT/US2013/042918) from International Searching Authority (USPTO) dated Nov. 27, 2013".

(Continued)

*Primary Examiner* — Tammara Peyton
(74) *Attorney, Agent, or Firm* — Klein, O'Neill & Singh, LLP (57) ABSTRACT

Methods and systems for automatically creating a cluster are provided. The method includes discovering at least a first and a second intelligent storage adapter, determining if the first or the second intelligent storage adapter is operating within a cluster, and when neither the first or the second intelligent storage adapter are a part of any cluster, then automatically generating a cluster with a unique identifier and assigning one of the first or the second intelligent storage adapters as a master of the cluster.

15 Claims, 6 Drawing Sheets

(56) References Cited

U.S. PATENT DOCUMENTS

| | | | |
|---|---|---|---|
| 9,232,005 | B1* | 1/2016 | Shah ................ G06F 3/067 |
| 2003/0135782 | A1 | 7/2003 | Matsunami et al. |
| 2003/0172149 | A1 | 9/2003 | Edsall et al. |
| 2005/0027798 | A1 | 2/2005 | Chiou et al. |
| 2005/0210314 | A1 | 9/2005 | Iguchi |
| 2006/0031653 | A1 | 2/2006 | Todd et al. |
| 2006/0075190 | A1 | 4/2006 | Higaki et al. |
| 2006/0095709 | A1 | 5/2006 | Achiwa |
| 2006/0218362 | A1 | 9/2006 | McManis |
| 2006/0282618 | A1 | 12/2006 | Thompson et al. |
| 2007/0016681 | A1 | 1/2007 | Suzuki et al. |
| 2007/0028073 | A1 | 2/2007 | Takayama et al. |
| 2008/0071984 | A1 | 3/2008 | Araki et al. |
| 2008/0270700 | A1 | 10/2008 | Rao et al. |
| 2008/0270727 | A1 | 10/2008 | Jacobson et al. |
| 2009/0055507 | A1 | 2/2009 | Oeda |
| 2009/0064161 | A1 | 3/2009 | Hosouchi et al. |
| 2009/0187713 | A1 | 7/2009 | Zedlewski et al. |
| 2009/0210620 | A1 | 8/2009 | Jibbe et al. |
| 2009/0265507 | A1 | 10/2009 | Jibbe et al. |
| 2010/0281230 | A1 | 11/2010 | Rabii et al. |
| 2011/0087833 | A1 | 4/2011 | Jones |
| 2011/0138136 | A1 | 6/2011 | Shitomi et al. |
| 2011/0191534 | A1 | 8/2011 | Ash et al. |
| 2011/0197046 | A1 | 8/2011 | Chiu et al. |
| 2011/0238672 | A1 | 9/2011 | Agarwala et al. |
| 2011/0276746 | A1 | 11/2011 | Pruthi et al. |
| 2011/0289279 | A1 | 11/2011 | Sonnier et al. |
| 2012/0005668 | A1 | 1/2012 | Serizawa et al. |
| 2012/0089786 | A1 | 4/2012 | Pruthi |
| 2012/0102137 | A1 | 4/2012 | Pruthi et al. |
| 2012/0137059 | A1 | 5/2012 | Yang et al. |
| 2012/0159053 | A1 | 6/2012 | Kano et al. |
| 2012/0221729 | A1 | 8/2012 | Hara et al. |
| 2012/0254504 | A1 | 10/2012 | Syu et al. |
| 2012/0254509 | A1 | 10/2012 | Cleveland et al. |
| 2012/0331222 | A1 | 12/2012 | Jibbe et al. |
| 2013/0042048 | A1 | 2/2013 | Kutergin et al. |
| 2013/0080715 | A1 | 3/2013 | Mori et al. |
| 2013/0111474 | A1 | 5/2013 | Agarwal et al. |
| 2013/0132673 | A1 | 5/2013 | Saito et al. |
| 2013/0198457 | A1 | 8/2013 | Kobayashi et al. |
| 2013/0198459 | A1 | 8/2013 | Joshi |
| 2013/0238851 | A1 | 9/2013 | Chang et al. |
| 2013/0282982 | A1 | 10/2013 | Hayashi |
| 2013/0290571 | A1 | 10/2013 | Rizzo et al. |
| 2013/0332612 | A1 | 12/2013 | Cai et al. |
| 2013/0339600 | A1 | 12/2013 | Shah |
| 2014/0013027 | A1 | 1/2014 | Jannyavula Venkata et al. |
| 2014/0122778 | A1 | 5/2014 | O'Brien |
| 2014/0129521 | A1* | 5/2014 | Marsden ................ H04W 4/02 707/623 |
| 2014/0244935 | A1 | 8/2014 | Ezra et al. |
| 2014/0258533 | A1 | 9/2014 | Antony |
| 2015/0058547 | A1 | 2/2015 | Thatcher et al. |
| 2015/0134920 | A1 | 5/2015 | Anderson et al. |
| 2015/0143023 | A1 | 5/2015 | Rostoker et al. |

OTHER PUBLICATIONS

"Written Opinion on corresponding PCT application (PCT/US2013/042918) from International Searching Authority (USPTO) dated Nov. 27, 2013".

"Office Action from USPTO dated Dec. 24, 2014 for U.S. Appl. No. 13/790,395".

"International Preliminary Report on Patentability on corresponding PCT application (PCT/US2013/042918) from International Bureau (WIPO) dated Dec. 16, 2014".

"Office Action from USPTO dated Feb. 20, 2015 for U.S. Appl. No. 13/790,894".

"Office Action from USPTO dated Mar. 3, 2015 for U.S. Appl. No. 13/790,800".

"Office Action from USPTO dated Mar. 11, 2015 for U.S. Appl. No. 13/790,846".

"Office Action from USPTO dated Mar. 27, 2015 for U.S. Appl. No. 13/790,471".

"Office Action from USPTO dated May 7, 2015 for U.S. Appl. No. 13/790,499".

"QLOGIC 10000 Series QLogic FabricCache Adapter Data Sheet", (Nov. 2013).

"Notice of Allowance from USPTO dated Aug. 14, 2015 for U.S. Appl. No. 13/790,846".

"Final Office Action from USPTO dated Aug. 18, 2015 for U.S. Appl. No. 13/790,395".

"Notice of Allowance from USPTO dated Sep. 23, 2015 for U.S. Appl. No. 14/088,082".

"Final Office Action from USPTO dated Sep. 24, 2015 for U.S. Appl. No. 13/790,800".

"Final Office Action from USPTO dated Oct. 8, 2015 for U.S. Appl. No. 13/790,471".

"Final Office Action from USPTO dated Sep. 15, 2015 for U.S. Appl. No. 13/790,894".

"Office Action from USPTO dated Oct. 19, 2015 for U.S. Appl. No. 14/165,100".

"Final Office Action from USPTO dated Oct. 23, 2015 for U.S. Appl. No. 13/790,499".

"Notice of Allowance from USPTO dated Nov. 25, 2015 for U.S. Appl. No. 13/790,846".

"Notice of Allowance from USPTO dated Jan. 15, 2016 for U.S. Appl. No. 13/790,395".

"Extended European Search Report from EPO dated Jan. 28, 2016 for EP Application No. 13803862.5".

"Notice of Allowance from USPTO dated Mar. 30, 2016 for U.S. Appl. No. 13/790,471".

"Office Action from USPTO dated Feb. 26, 2016 for U.S. Appl. No. 13/790,499".

"Notice of Allowance from USPTO dated Mar. 1, 2016 for U.S. Appl. No. 13/790,471".

Office Action from USPTO dated Feb. 24, 2015 for U.S. Appl. No. 13/902,427.

"VMWare Storage Best Practices", *VMWare*, (Apr. 2011), https://www.vmware.com/files/pdf/support/landing_pages/Virtual-Support-Day-Storage-Best-Practices-June-2012.pdf.

Notice of Allowance from USPTO dated Aug. 26, 2015 for U.S. Appl. No. 13/902,427.

Office Action from USPTO dated Dec. 4, 2015 for U.S. Appl. No. 14/193,691.

Notice of Allowance from USPTO dated Jan. 29, 2016 for U.S. Appl. No. 14/470,309.

Notice of Allowance from USPTO dated Mar. 1, 2016 for U.S. Appl. No. 14/470,337.

Office Action from USPTO dated Mar. 2, 2016 for U.S. Appl. No. 14/593,898.

Office Action from USPTO dated Mar. 9, 2016 for U.S. Appl. No. 14/312,130.

Notice of Allowance from USPTO dated Apr. 11, 2016 for U.S. Appl. No. 13/790,395.

Final Office Action from USPTO dated Apr. 21, 2016 for U.S. Appl. No. 14/165,100.

Notice of Allowance from USPTO dated Apr. 26, 2016 for U.S. Appl. No. 14/498,580.

Office Action from USPTO dated May 6, 2016 for U.S. Appl. No. 14/339,086.

* cited by examiner

METHODS AND SYSTEMS FOR AUTOMATICALLY ADDING INTELLIGENT STORAGE ADAPTERS TO A CLUSTER

TECHNICAL FIELD

The present disclosure relates to storage systems and, more particularly, to generating clusters.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data, for example, direct-attached storage (DAS), network attached storage (NAS), and storage area networks (SANs).

A DAS system typically includes a plurality of storage drives that are directly attached to a computing device (for example, a server) and are accessible via a host bus adapter (HBA). Common protocols used for DAS storage devices are SCSI (Small Computer Systems Interface), ATA (AT attachment), SATA (Serial ATA), SAS (Serial Attached SCSI), and others.

NAS is file-level storage that provides access to a plurality of computing devices. NAS typically uses network file sharing protocols, for example, NFS (Networked File System), CIFS (Common Internet File System), and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often use a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet), and other protocols for storing data at storage devices. Continuous efforts are being made to better provide access to storage systems.

BRIEF DESCRIPTION OF THE DRAWINGS

The present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an intelligent storage adapter (ISA), for example, a network device is provided. The ISA includes a storage protocol controller having a port for interfacing with a storage area network (SAN)-based storage device and another adapter operating within a cluster. The ISA also includes a processor executing instructions for managing a local storage device that is configured to operate as a caching device for a computing device. The ISA operates as a host bus adapter and a storage controller for managing storage space at the local storage device and the SAN-based storage device.

In another embodiment, methods and systems for creating a cluster having more than one ISA are provided. A cluster is automatically created when one or more ISAs are initialized and discovered, as described below in detail.

Figure 1A:
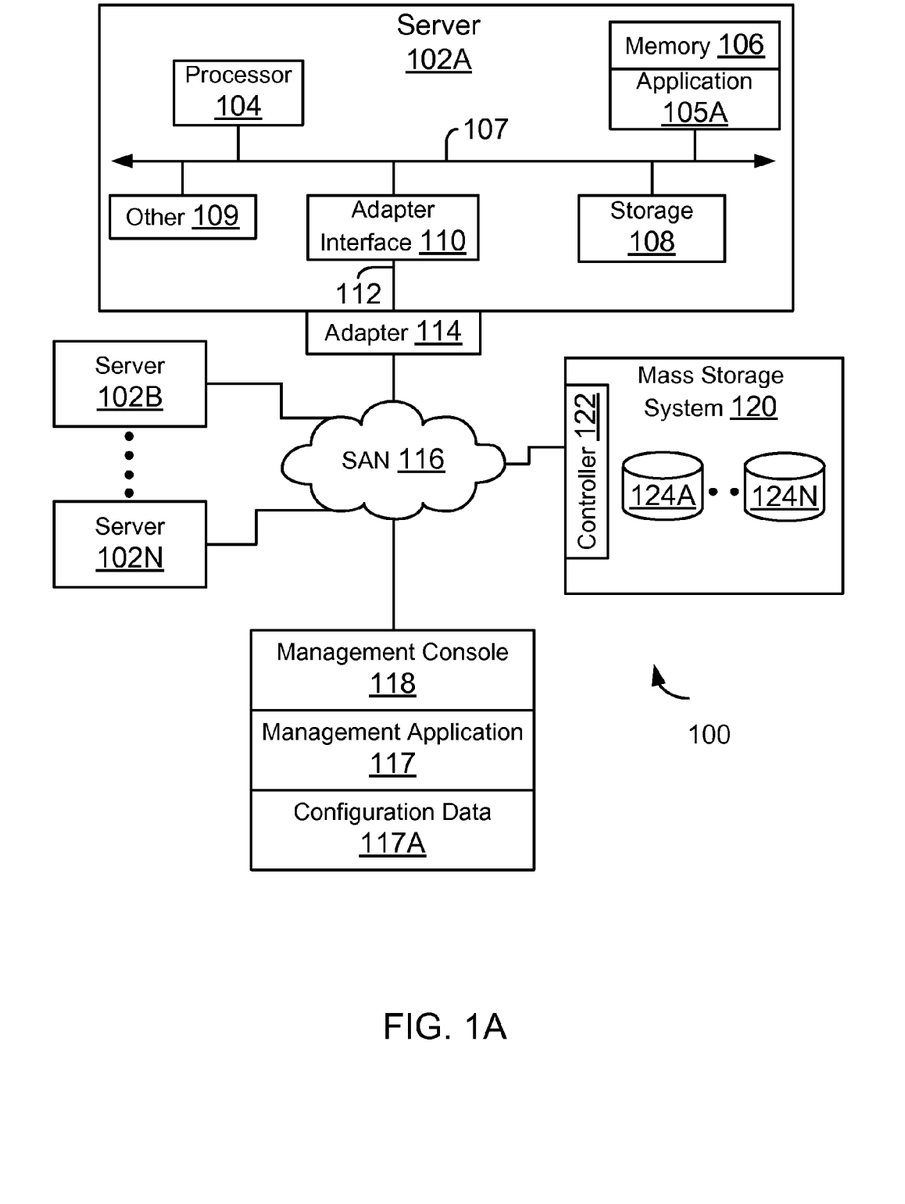
FIG. 1A is a functional block diagram of a system, according to one embodiment.

System 100:

FIG. 1A is a block diagram of a system 100 configured for use with the present embodiments. System 100 may include a plurality of computing systems 102A-102N (may also be referred to as server(s) 102 or host system(s) 102), each coupled to an ISA 114 that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine-implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108, which may be for example a hard disk, a CD-ROM, a non-volatile memory device (flash or memory stick), or any other storage device for storing structured or unstructured data. Storage 108 may store operating system program files (or data containers), application program files, for example, e-mail applications, database applications, management applications, and other application files. Some of these files are stored in storage 108 using an installation program. For example, the processor 104 may execute computer-executable process steps of an installation program so that the processor 14 can properly execute the application program.

In one embodiment, storage device 108 may be a solid state storage device (may also be referred to herein as SSD 108). SSDs are becoming popular for servers that may need to store large amounts of data. ISA 114, which is described below in more detail, may be used to manage and/or access the storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown).

In one embodiment, processor 104 may execute an application 105A for performing certain functions. For example, application 105A may be a database application, a virtual machine executed in a virtual environment (provided by VMware Corporation, Microsoft Corporation or any other entity), electronic e-mail application (for example, Microsoft Exchange), or any other application type. Application 105A may issue read and write requests that are processed by ISA 114, as described below in more detail. Application 105A may also be referred to as a "client."

The computing system 102A also includes other devices and interfaces 109, which may include a display device interface, a keyboard interface, a pointing device interface, and others. The details of these components are not germane to the inventive embodiments.

ISA 114 may be configured to handle both network and storage traffic while interfacing with other elements. In one embodiment, as described below in detail, ISA 114 may be configured to provide the functionality of a host bus adapter (HBA) by providing connectivity to SAN (storage area network)-based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114 can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114 may operate as an initiator as well as a target for responding to input/output (referred to as I/O or "IO") requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114 may be referred to as a "cache" LUN. A cache LUN may be used to cache data stored at a SAN LUN or another data LUN. The cache LUN is managed by ISA 114 and may not be visible to application 105A.

Referring back to FIG. 1A, computing system 102 uses an adapter interface 110 to communicate with ISA 114 via a link 112. In one embodiment, link 112 may be a PCI-Express link or any other interconnect type. The adaptive embodiments disclosed herein are not limited to any particular link type.

ISA 114 may communicate and interface with a mass storage system 120 via a SAN 116 that may include one or more switches (may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114 and other similar components.

System 100 may also include a management console 118, used according to one embodiment. Management console 118 may be a computer system similar to computing system 102A, described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

Management application 117 may also be used to configure a cluster having a plurality of ISAs. Details regarding how a cluster is created are provided below.

In one embodiment, ISA 114 is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114 may configure a LUN from the local storage 108 and present the LUN to servers 102A-102N, allowing the local storage 108 to be shared by other servers 102B-102N.

In another embodiment, ISA 114 provides traditional SAN connectivity to computing systems 102A-102N and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
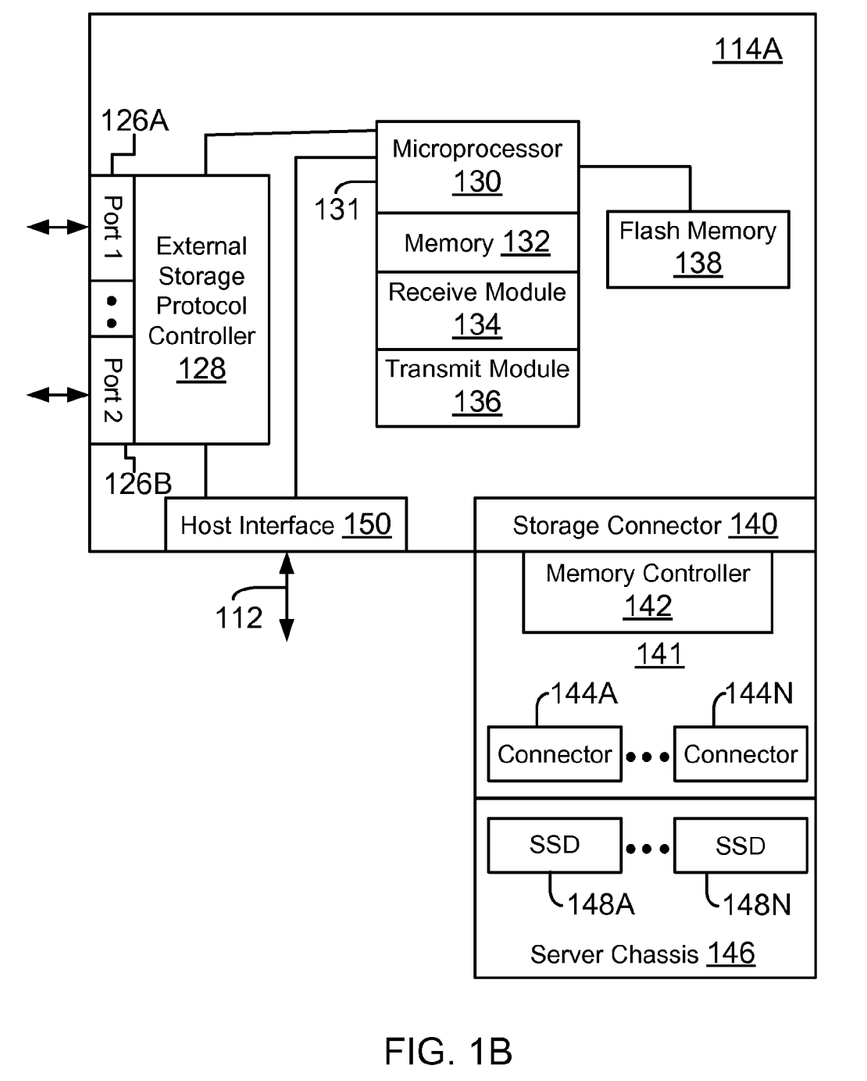
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)). Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers FC0-FC3. FC0 is defined by the Fibre Channel specification as the physical layer, which includes cables (fiber optics, twisted-pair), connectors, and others. FC1 layer is defined as the data link layer. This layer implements the 8B/10B encoding and decoding of signals. FC2 layer is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 depends on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a micro-processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by micro-processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector, or any other connector type based on the interconnect used by SOC 131 to interface with the SSDs. The daughter card 141 includes a memory controller 142 that interfaces with a plurality of connectors 144A-144N. The plurality of connectors 144A-144N are used to plug in SSDs 148A-148N (similar to storage 108). In this embodiment, SSDs 148A-148N are included within a server chassis 146. In one embodiment, connectors 144A-144N may be SATA connectors for receiving SSDs 148A-148N. In another embodiment, connectors 144A-144N may be SAS connectors.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

Another embodiment of ISA 114A is configured such that a daughter card has the SSDs 148A-148N on the card itself, rather than on the server chassis 146. Another embodiment of ISA 114A is configured such that the memory controller 142 is on the same card as the other components of ISA 114A. The SSDs 148A-148N are also on the same card connected via one or more storage connectors.

Figure 1C:
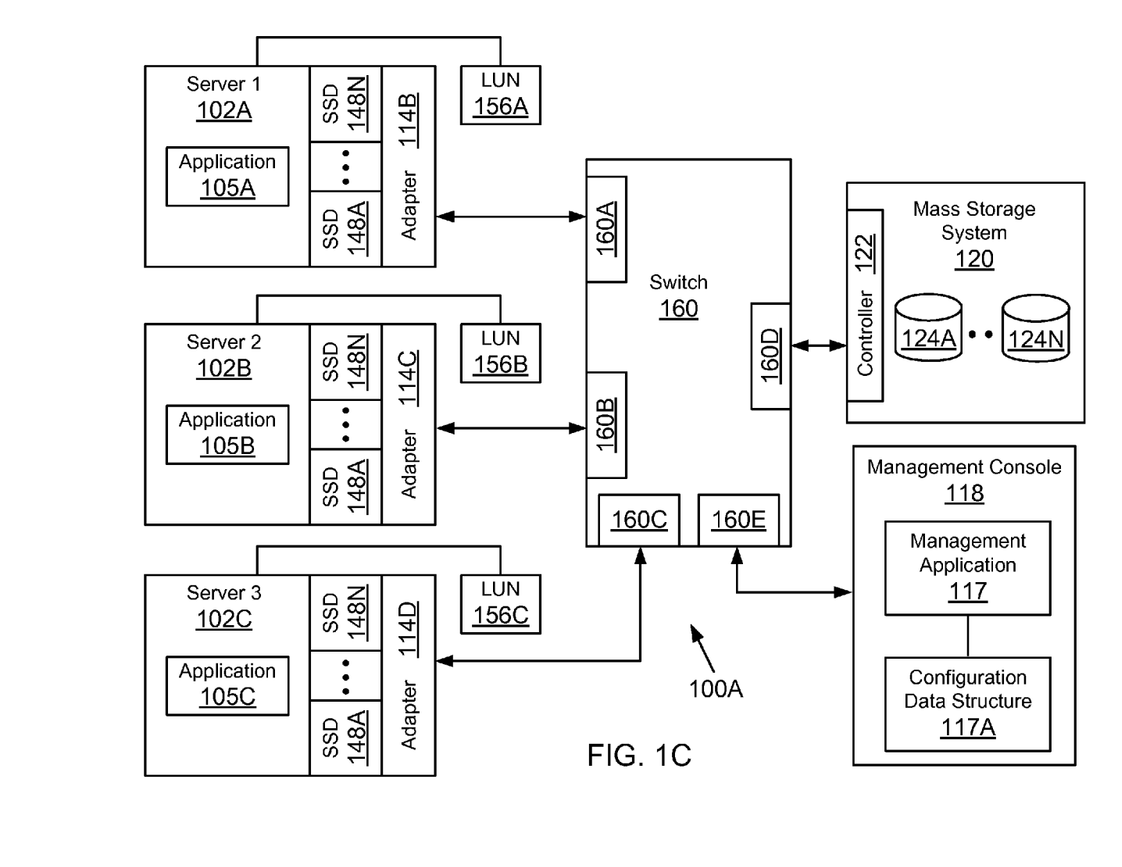
FIG. 1C shows an example of a configuration for using the ISAs, according to one embodiment.

FIG. 1C shows a system 100A where each ISA 114B-114D (similar to ISA 114A described above) in servers 102A-102N is coupled to a fabric switch 160, according to one embodiment. Fabric switch 160 includes a plurality of ports 160A-160E. Ports 160A-160C are coupled to ISA 114B-114D ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105E executed by server 102B, and application 105C executed by server 102C for storing information. The LUNs may be based on storage located at SAN-based storage 120 or at a local SSD 148A-148N. In one embodiment, one or more SAN LUNs are associated with an independent data LUN. The LUNs 156A-156N may also be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via SAN 116. In this example, a DAS (direct attached storage)-based SSD becomes accessible as SAN storage, while the DAS-based storage is still managed by an application 105A (for example, a database application).

In one embodiment, ISAs 114B-114C operate within a cluster. The cluster is configured using management application 117. The cluster is identified by a unique identifier. Within the cluster, a specific ISA may operate as a LUN owner of a "cache owner." The cache owner adapter interfaces with the SAN LUN for executing read and write operations. As an example, adapter 114B may be the cache owner for LUN 156A that is presented to application 105A. In this configuration, ISA 114C becomes the client ISA or the client adapter.

Figure 1D:
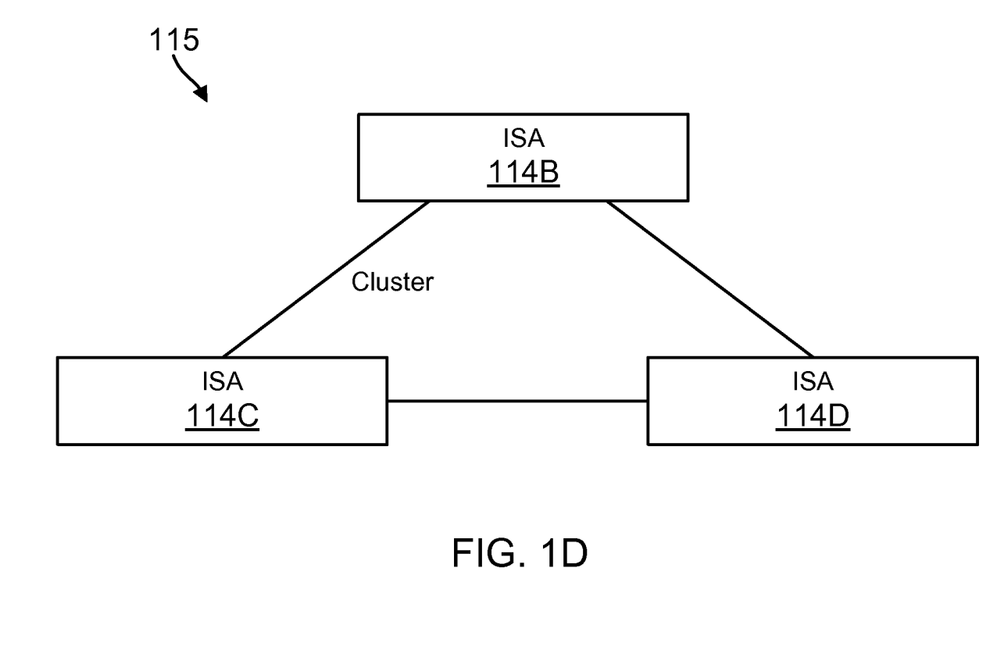
FIG. 1D shows an example of a cluster.

FIG. 1D shows an example of a cluster 115 that includes ISAs 114B-114C. In conventional systems, a user must create a cluster and then manually add an ISA to the cluster. In the embodiments disclosed herein, a cluster is automatically created when more than one ISA is deployed and discovered. An ISA is also automatically added when an ISA is initialized for communication within a cluster, as described below with respect to FIG. 2.

Figure 2:
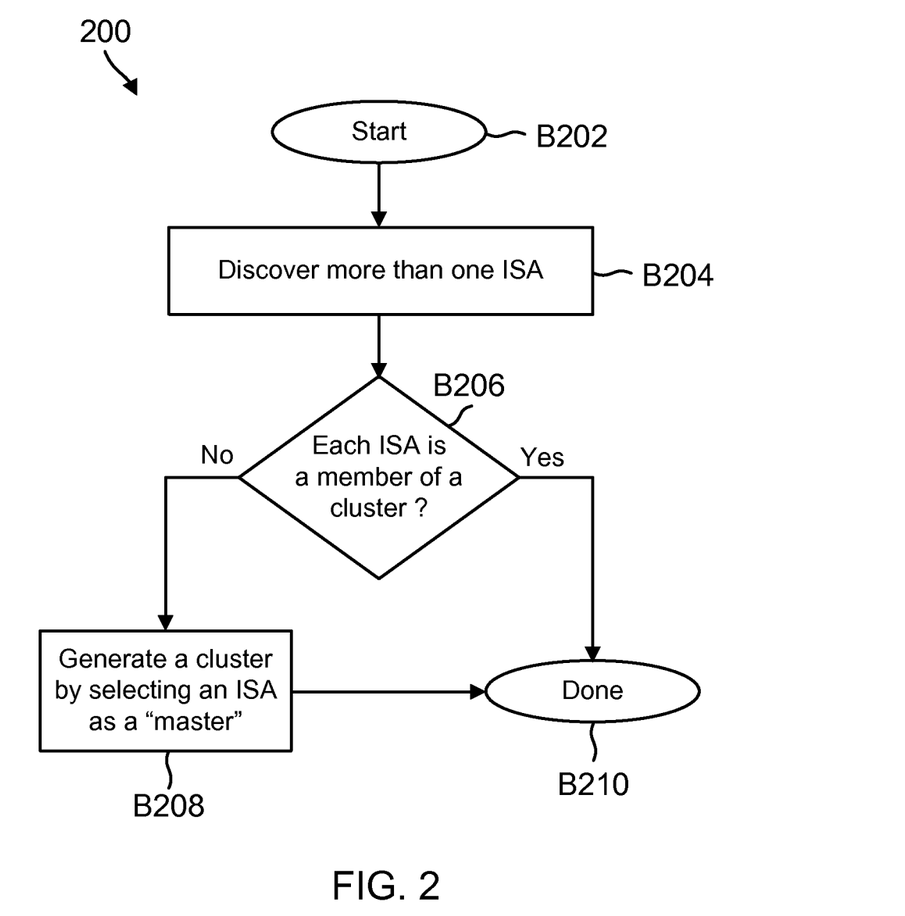
FIGS. 2-3 show process flows according to various embodiments of the present disclosure.

FIG. 2 shows a process 200 for automatically creating a cluster, according to one embodiment. The process begins in block B202, when at least two ISAs (for example, ISA 114B and 114C) are initialized and operational. Management application 117 is also initialized and is used to generate a cluster.

In block B204, the ISAs discover each other. In one aspect, the ISAs can discover each other by sending out discovery requests and receiving a response. The response provides a unique adapter ID for each ISA. The ISA identifiers are stored at each ISA as well as at the configuration data structure 117A.

In block B206, the process determines if the discovered ISAs are a part of an existing cluster. Each ISA and the management application 117A maintain information regarding each cluster. The information includes a unique cluster identifier and ISA identifier that is a member of the cluster. The discovered ISA identifiers are compared with the stored information to determine if the ISAs are a member of an existing cluster. If yes, then the process ends in block B210.

If the discovered. ISAs are not a member of a cluster, then a new cluster is automatically generated with a unique cluster identifier. The management application 117 generates the cluster and stores the cluster identifier information at data structure 117A. The ISA with the lowest identifier value or the highest identifier value may be designated as the primary ISA and the other ISAs operate as secondary ISAs. The various embodiments described herein are not limited to any specific methodology for assigning a primary ISA. After the cluster is generated and a primary ISA is assigned, the process ends in block B210.

Figure 3:
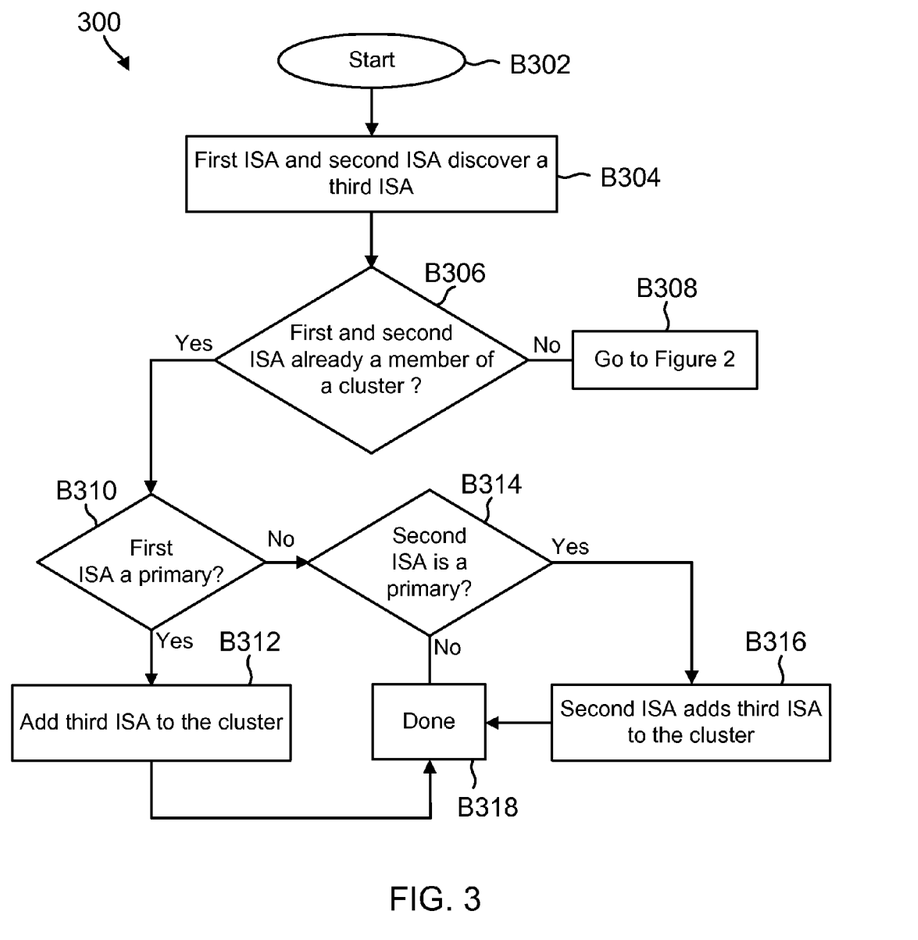

FIG. 3 shows a process 300 for automatically adding a discovered ISA. Process 300 is described below with respect to the example of FIG. 1D where ISA 114B may be designated as the first ISA, the ISA 114C as the second ISA, and ISA 114D as the third ISA.

The process begins in block B302, when ISA 114B and ISA 114C are operational and initialized. In block B304, ISA 114B and ISA 114C discover ISA 114D. In block B306, the process determines if both the ISAs 114B and 114C are part of a cluster. If not, then in block B308, the process reverts back to FIG. 2 where a cluster is generated.

If yes, then in block B310, ISA 114B determines if it is a primary ISA. If yes, then in block B312, ISA 114B adds ISA 114D as a slave to the existing cluster. ISA 114B updates its data structure and notifies both ISA 114C and ISA 11D about the addition. Management application 117 also updates the configuration data structure 117A to reflect ISA 114D as being a part of the cluster.

If ISA 114B is not the primary ISA, then in block B314, the process determines if ISA 114C is the primary ISA. If yes, then in block B316, similar to block B312, ISA 114D is then added as a member of the cluster by ISA 114C. Thereafter, the process ends in block B318.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine-implemented method, comprising:
   discovering at least a first and a second intelligent storage adapter;
   determining if the first or the second intelligent storage adapter is operating within a cluster;
   when neither the first nor the second intelligent storage adapter are a part of any cluster, then automatically generating a cluster with a unique identifier and assigning one of the first or the second intelligent storage adapters as a master of the cluster;
   discovering a third intelligent storage adapter by the master intelligent storage adapter of the cluster; and
   the master intelligent storage adapter automatically adding the third intelligent storage adapter to the cluster, when the third intelligent storage adapter is not a member of any cluster.

2. The method of claim 1, wherein the master intelligent storage adapter notifies the third intelligent storage adapter that it has been added to the cluster.

3. The method of claim 1, wherein the master intelligent storage adapter maintains a data structure for identifying the cluster and members of the cluster.

4. The method of claim 1, wherein the master intelligent storage adapter operates as a host bus adapter to access a storage area network storage device and manages storage space at a local storage device.

5. The method of claim 1, wherein the master intelligent storage adapter processes input/output requests for members of the cluster for any cached logical unit number (LUN).

6. A non-transitory, machine readable storage medium storing executable instructions, which when executed by a machine, causes the machine to perform a method, the method comprising:
   discovering at least a first and a second intelligent storage adapter;
   determining if the first or the second intelligent storage adapter is operating within a cluster;
   when neither the first or the second intelligent storage adapter are a part of any cluster, then automatically generating a cluster with a unique identifier and assigning one of the first or the second intelligent storage adapters as a master of the cluster;
   discovering a third intelligent storage adapter by the master intelligent storage adapter of the cluster; and
   the master intelligent storage adapter automatically adding the third intelligent storage adapter to the cluster, when the third intelligent storage adapter is not a member of any cluster.

7. The storage medium of claim 6, wherein the master intelligent storage adapter notifies the third intelligent storage adapter that it has been added to the cluster.

8. The storage medium of claim 6, wherein the master intelligent storage adapter maintains a data structure for identifying the cluster and members of the cluster.

9. The storage medium of claim 6, wherein the master intelligent storage adapter operates as a host bus adapter to access a storage area network storage device and manages storage space at a local storage device.

10. The storage medium of claim 6, wherein the master intelligent storage adapter processes input/output requests for members of the cluster for any cached logical unit number (LUN).

11. A system comprising:
   a processor executing instructions out of a memory for:
   discovering at least a first and a second intelligent storage adapter;
   determining if the first or the second intelligent storage adapter is operating within a cluster;
   when neither the first or the second intelligent storage adapter are a part of any cluster, then automatically generating a cluster with a unique identifier and assigning one of the first or the second intelligent storage adapters as a master of the cluster;
   discovering a third intelligent storage adapter by the master intelligent storage adapter of the cluster; and
   the master intelligent storage adapter automatically adding the third intelligent storage adapter to the cluster, when the third intelligent storage adapter is not a member of any cluster.

12. The system of claim 11, wherein the master intelligent storage adapter notifies the third intelligent storage adapter that it has been added to the cluster.

13. The system of claim 11, wherein the master intelligent storage adapter maintains a data structure for identifying the cluster and members of the cluster.

14. The system of claim 11, wherein the master intelligent storage adapter operates as a host bus adapter to access a storage area network storage device and manages storage space at a local storage device.

15. The system of claim 11, wherein the master intelligent storage adapter processes input/output requests for members of the cluster for any cached logical unit number (LUN).

* * * * *